Nov. 3, 1931.  E. M. GLASGOW  1,829,896
JUNCTION BOX
Filed Sept. 30, 1925
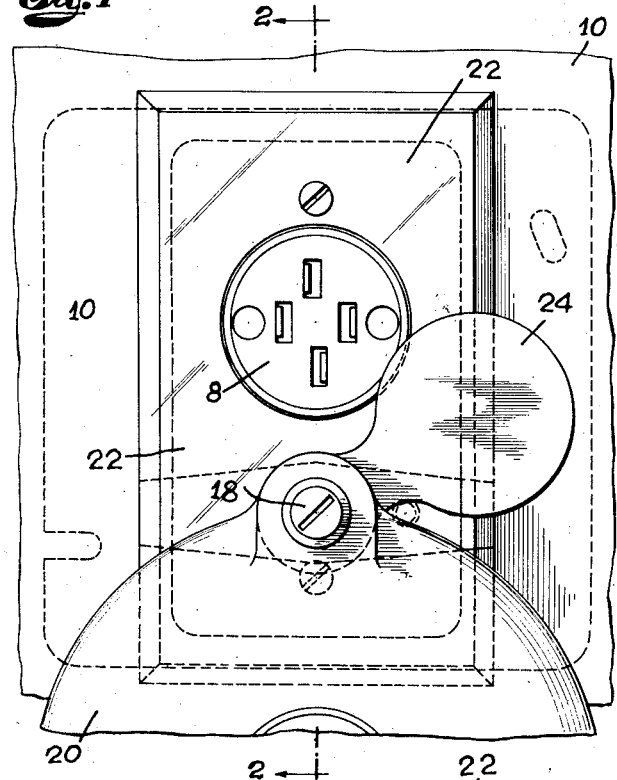
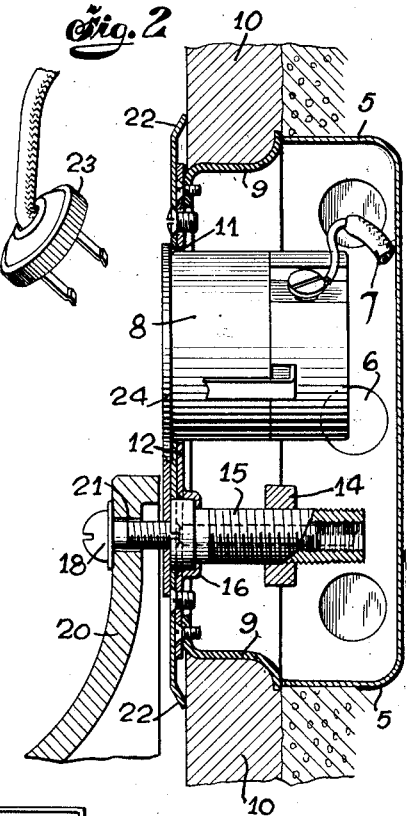
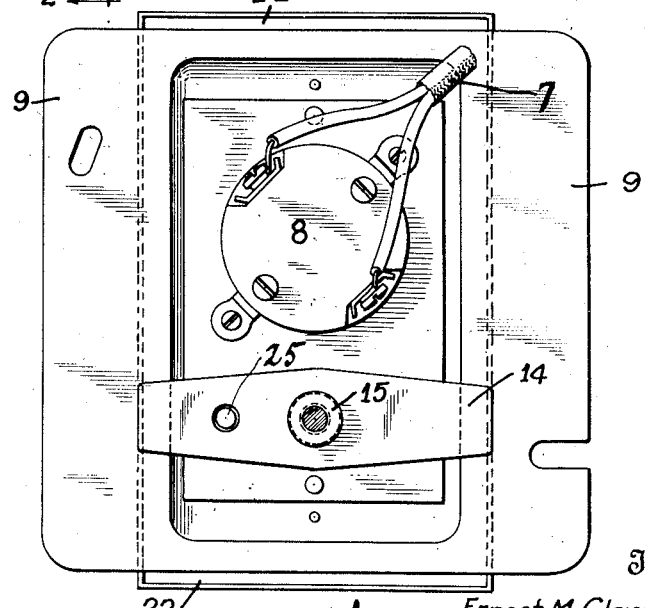
Inventor
Ernest M. Glasgow.
By his Attorneys
Townsend + Decker.

Patented Nov. 3, 1931

1,829,896

UNITED STATES PATENT OFFICE

ERNEST M. GLASGOW, OF TOWACO, NEW JERSEY, ASSIGNOR TO RUSSELL & STOLL COMPANY, OF NEW YORK, N. Y., A CORPORATION OF NEW YORK

JUNCTION BOX

Application filed September 30, 1925. Serial No. 59,474.

This invention relates to the art of electric fixtures it being a primary object of the invention to provide a wall fixture which will permit the usual electrical connections to be made therein and which will also support a device to be operated by the electric current, for example, an electric fan.

It is another object to provide a junction box having a relatively strong support for an electric fan or other device and one which is readily accessible for installation, replacement or adjustment whereby necessity of attaching the fan to the wall with the consequent disfigurement of the wall is obviated.

The invention further contemplates providing a cover for protecting the electrical fitting carried by the box when it is not in use.

More specific objects will appear from the following description.

In the drawings:

Fig. 1 is a front elevational view of the complete junction box and support.

Fig. 2 is a sectional view taken on the line 2—2 of Fig. 1.

Fig. 3 is a rear elevational view thereof.

Referring in detail to the drawings, there is disclosed a junction box having a cupped portion 5 provided with openings 6 through which the electrical connections 7 from the main conduits are brought into position to be coupled to the terminals of an electrical fitting 8 of any conventional or standard type. The junction box includes a cover 9 rigidly secured to the cupped portion 5, these parts being permanently embedded in the wall 10 or other support for the junction box. The cover 9 has the face thereof cut away to provide an opening 11 as illustrated permitting access to the interior of the junction box. A base plate 12 forms a support for the electrical fitting 8 and is secured across the opening 11 as by means of screws or otherwise. Said fitting is fastened to the plate 12 and the forward end thereof is received by a suitable opening in said plate.

In order to avoid a separate mounting for an electric fan or other electrically propelled instrument there is provided a supporting mechanism comprising a cross-arm 14 the ends of which engage against the rear side walls of the cover 9, the central portion thereof being apertured and screw-threaded for the reception of a hollow locking stud 15 of substantial strength and size which is internally and externally threaded. The head of the stud 15 is slotted as illustrated and said head bears against the plate 12, it being preferred to countersink the plate as indicated at 16 to form a recess for the reception of said head.

An externally threaded supporting screw 18 is screw-threadedly engaged with the interior of the stud 15 and forms a support for an electric fan base 20 by being passed through an aperture 21 usually provided as a supporting means for fans and the like. As the stud 15 is rigidly supported by the plate 12 and cross-arm 14, said stud provides a support of substantial strength for the fan base 20 whereby the fan may be directly connected to the junction box.

An ornamental face plate 22 is preferably detachably secured to the plate 12, as by the screws illustrated, said face plate being provided with an opening interfitting with and permitting access to the electrical fitting 8 and having another opening receiving the head of the stud 15.

The fitting 8 is provided with the usual slots or openings adapted to receive the jacks of a plug 23 which is electrically connected with the terminals of the fan so that power may be conveniently supplied to said fan. In order to protect and cover the electrical fitting 8 when the plug 23 is not connected therewith a shield member 24 is provided and is pivotally mounted on the supporting screw 18 so that when said fitting is not in use the member 24 will cover the face of the fitting 8 to protect it and to provide a neat appearance for the fixture. To prevent the cross-arm 14 from swivelling on the stud 15 and thereby obviate the possibility of an end of said arm contacting with a terminal on the rear end of the fitting 8, I have provided a pin 25 secured to the inner side of plate 12 and extending loosely through an opening in said cross-arm.

The method of assembling the above-described mechanism will be readily understood. The junction box portions 5 and 9 having been embedded in the wall and the fitting 8 attached to the inner face of the plate 12, the cross arm 14 may be slidably mounted upon the inner end of the pin 25 and the stud 15 screwed to a slight extent upon the cross arm 14. The assembled plate 12, fitting 8, stud 15 and cross arm 14 may then be turned to a slight angle to one side and the upper portion thereof inclined outwardly so that the cross arm will pass behind the shoulder on the junction box 9. The plate 12 is then moved to its final vertical position and the stud 15 turned to draw the plate 12 and cross arm 14 firmly against the front and rear shoulders of the member 9. The face plate 22 may then be secured to the inner plate 12 and the shield member 24 and fan base 20 mounted upon the screw stud 21 as described above.

It will be seen that by the above described construction there is provided a complete junction box embodying a supporting mechanism for an electric fan or the like, the supporting mechanism being normally rigidly secured to the junction box but being accessible for repairs, replacement and the like. The fixture is compact and has a neat appearance and when not in use the electrical fitting is hidden from view for protection and to enhance the appearance thereof.

Having now described my invention, what I claim and desire to secure by Letters Patent is:

1. In combination, a junction box formed with opposed shoulders, a plate forming a wall of said box and provided with an opening, an exteriorly and interiorly screw-threaded hollow stud extending through said plate, a screw engaged within said stud at the outer end thereof, a cross arm having a threaded aperture in engagement with the outer screw threads of said stud, said cross arm having portions engaging the shoulders of the box, said stud and plate having interengaging means permitting rotation of the stud and preventing relative movement between the two in the direction of the stud axis and a stationary pin mounted on the plate and extending through said cross arm.

2. A wall fixture comprising in combination a junction box having a body portion and a cover portion formed to provide an opening with front and rear surfaces around it, a supporting plate member adapted to carry an electrical fitting in said opening and having its ends positioned on the front surfaces of said cover portion, fastening means at the ends of said plate member and clamping means rigidly supporting said plate in said position comprising a clamping member engaging rear surfaces of said cover portion and screw means between said clamp and said plate acting to draw them together on said cover portion, and attaching means cooperating with said plate and clamping means to support an object from said junction box.

3. A wall fixture comprising in combination a junction box having a body part and a cover part adapted to carry an electrical fitting at one portion and an accessory fan or the like, at another portion, a supporting plate member for said fitting and means for separately supporting said accessory comprising a detachable clamping member engaging said cover adjacent the point of accessory support, and means between said clamp and plate adapted to draw them together on said cover and positioned adjacent the point of accessory support so as to transfer the accessory supporting stresses to said cover portion at said point.

4. A wall fixture comprising in combination a junction box having a cover portion formed to provide an opening with front and rear surfaces around it, a supporting plate member adapted to carry an electrical fitting in said opening and having its ends positioned on the front surfaces of said cover portion, fastening means for said plate member and clamping means rigidly supporting said plate comprising a clamping member engaging rear surfaces of said cover portion, a screw member engaging said clamping member and drawing the clamping member and plate member toward each other on the cover portion, and attaching means directly carried by said screw member to support an object from said junction box and acting to transmit the supporting strains in direct line to said screw member and clamping member.

Signed at New York in the county of New York and State of New York this 29th day of September A. D. 1925.

ERNEST M. GLASGOW.